United States Patent [19]

Fekete

[11] Patent Number: 4,458,494
[45] Date of Patent: Jul. 10, 1984

[54] PREVENTING VAPORIZATION OF THE LIQUID IN A CENTRIFUGAL GAS-LIQUID SEPARATOR

[76] Inventor: Lancelot A. Fekete, 1632 Colquitt St., Houston, Tex. 77006

[21] Appl. No.: 425,636

[22] Filed: Sep. 28, 1982

[51] Int. Cl.³ ............................................. F25B 9/02
[52] U.S. Cl. ............................................. 62/5; 55/17
[58] Field of Search ............................. 62/5; 55/17

[56] References Cited

U.S. PATENT DOCUMENTS

| | | | |
|---|---|---|---|
| 1,952,281 | 3/1934 | Ranque | 62/5 |
| 2,683,972 | 7/1954 | Atkinson | 62/5 |
| 2,907,174 | 10/1959 | Hendal | 62/5 |
| 2,955,432 | 10/1960 | Hardebol et al. | 62/5 |
| 2,971,342 | 2/1961 | Pilcher | 62/5 |
| 3,296,807 | 1/1967 | Fekete | 62/5 |
| 3,546,891 | 12/1970 | Fekete | 62/5 |
| 3,775,988 | 12/1973 | Fekete | 62/5 |

Primary Examiner—Ronald C. Capossela

[57] ABSTRACT

This patent refers to a gas-liquid separation process by centrifugal force, which takes place in a fast turning vortex confined in a tube, similar to inventor's former patents. Against the separating centrifugal force the thermal (Ranque) effect tends to heat the periphery of the tube and vaporize the liquid. This improvement refers to a method of preventing the vaporization of the liquid, either by cooling a short section of the periphery with a cooling jacket, or by taking out the liquid at a short distance from the inlet, where the heating effect on the periphery is minimal, and insulating the liquid from this heating effect. It also refers to the method of control of this liquid separation, and the process of using it as a wellhead oil and gas separator.

4 Claims, 4 Drawing Figures

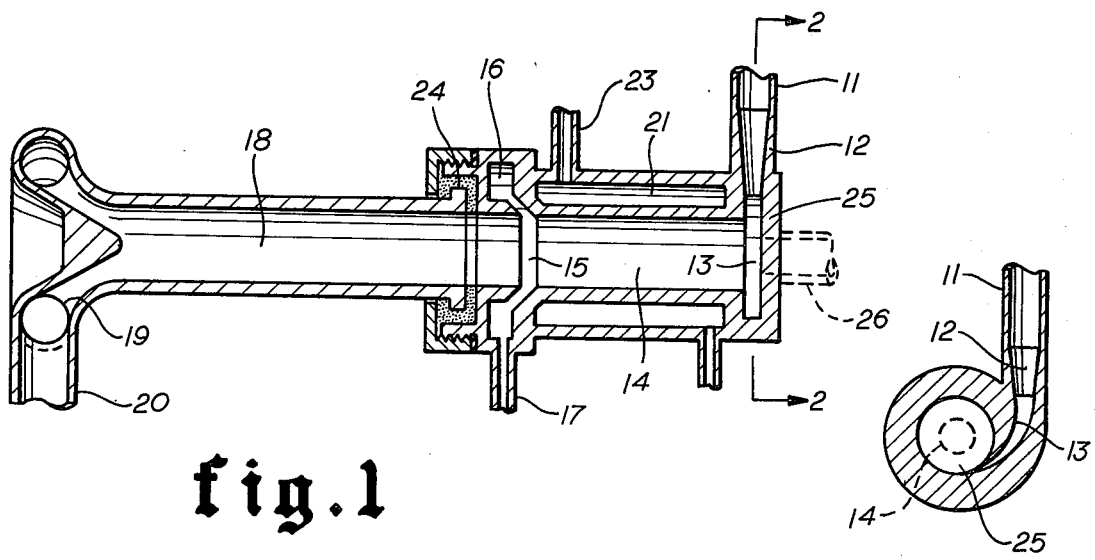
fig.1
fig.2
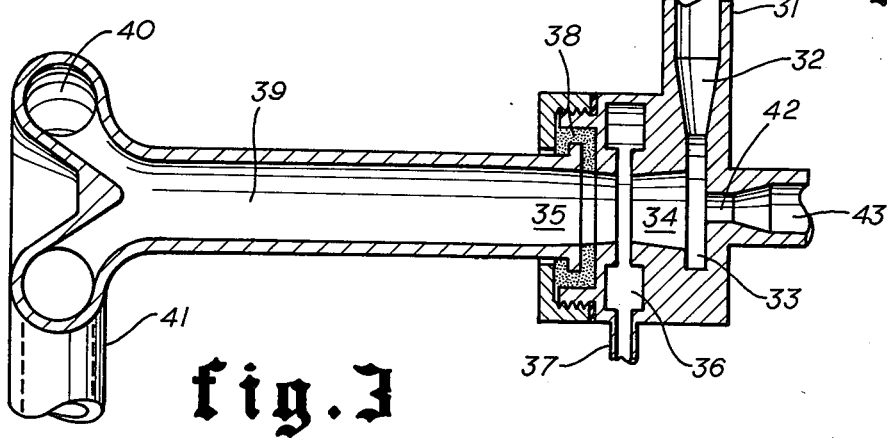
fig.3
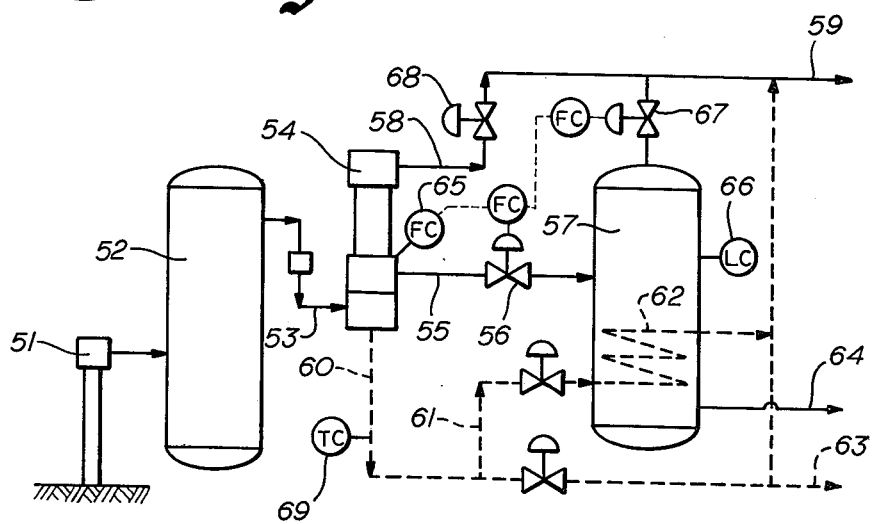
fig.4

PREVENTING VAPORIZATION OF THE LIQUID IN A CENTRIFUGAL GAS-LIQUID SEPARATOR

This improvement relates to a high speed centrifugal gas-liquid separator in which the gas or gas-liquid mixture enters tangentially into a cylindrical or cylindro-conical tube and it is allowed to expand to a lower pressure forming a high velocity vortex. If the ratio of the inlet pressure to the discharge pressure is larger than the critical pressure ratio, than the average inlet velocity is nearly the velocity of sound. If the pressure is increased, the inlet velocity and the volume flowrate remain nearly constant. If the pressure ratio decreases below the critical pressure ratio, both the temperature effect and the centrifugal separation effect decrease rapidly. The cross sectional area of the tube should be in the range of 10 to 20 times the cross section of the inlet, and at nearly sonic inlet velocities the rotational velocity of the vortex is in the range of millins of RPM, so that the maximum centrifugal acceleration is in the range of million times the earth's gravity. This high centrifugal force assures a perfect separation of the liquid from the gas. The centrifugal field strips the gas from its higher molecular weight components, so that when the gas leaves the centrifugal field, it is undersaturated, dry gas. At the same time, the liquid in the centrifugal field is in a very high gravitational field, so that the low molecular weight gaseous components are squeezed out into the gas area, leaving the liquid undersaturated of gas. The process is not static chemical equilibrium process, and produces a rather high efficiency separation on both the liquid and on the gas side.

The strong centrifugal field and high velocity vortex produces a thermal effect, the so called Ranque effect, see inventor's U.S. Pat. Nos. 3,296,807, 3,456,891 and 3,775,988, and Ranque's U.S. Pat. No. 1,952,281. The turbulent heat transfer results in a temperature increase in the periphery and a temperature decrease in the center, in the range of hundreds of degrees F. Inventor experienced that the liquid which was thrown to the periphery was heated and evaporated, so that the liquid which was thrown to the periphery was heated and evaporated, so that the separation efficiency decreased considerably. He tried to prevent this by cooling the periphery of the tube with a cooling jacket. Cooling the entire periphery helps somewhat, but more efficient measure had to be taken. The first measure was to cool only a part of the tube periphery, and take out the liquid at the end of the cooling jacket. Experimental data show that the heat transfer from the center to the periphery does not occur instantly, but it starts slowly and the maximum tube wall temperature is located at a distance of 5 to 10 diameters from the inlet. Up to a distance of one diameter from the inlet the heat transfer to the periphery is very small, even if the metal wall conducts heat from the downstream part of the periphery towards the inlet. If the liquid is taken out at less than one diameter from the inlet, and the wall section on the downstream side of the liquid outlet is made of insulating material, the vaporization of the liquid due to the thermal effect is negligible.

The thermal effect of the vortex tube on its hot and cold end produces temperature differences of in the range of 100° F. and is used in refrigeration and heating processes where instant cold or heat is needed and compressed air and gas are available. It was experienced that if the gas contains condensable vapors, the thermal effect is reduced considerably (Ranque, 1933). The proposed improvements of preventing evaporation can be used to take out the condensable vapors from the gas before the thermal effect is started. This will make the vortex tube a considerably more useful device and may contribute to many new applications of the process.

For good separation, it is essential that no liquid should be entrained with the gas and no gas should be mixed and carried out with the liquid beyond that of the (dynamic) equilibrium content. This means that the liquid outlet shall be designed to have a safe quantity of gas above the swirling liquid so as to allow the liquid level to raise if the liquid flow is suddenly increased, but not to enter into the tube; the centrifugal force on the liquid vortex prevents the dissolution of the gas. But if the liquid level is very low, the ring opening can be filled up with gas and there will be no centrifugal effect, and the liquid will absorb gas and be saturated at the corresponding pressure and temperature, the separation will not be perfect. To prevent this a low level control is needed in the liquid outlet ring. If the high level sensor indicates liquid, it shall act on the control valve to open it; if the low level sensor indicates gas, it shall act on the control valve to close it so that more liquid remains in the ring shaped liquid outlet.

The obvious use of the high speed centrifugal gas-liquid separator is as wellhead oil-gas separator. The oil and gas wells contain a mixture of oil, gas and water at high pressure in varying amounts. When pressure is released the gas cools off by expansion and is chemically bonded to the available water to form solid hydrates. These hydrates ae deposited in the piping, valves and fittings and cause trouble. Most field separators use fired heaters to heat the oil-gas mixture in order to prevent hydrate formation. If the oil-gas-water mixture at the wellhead is expanded in a vortex tube, the dry gas will be separated from the water during expansion and there will be no hydrate formation.

The dimensions of such a separator are small due to the high velocities involved, and it has no moving parts, so that it may be used to solve efficiently many separation problems.

The devices by which the above described process is realized are represented schematically by the following drawings.

FIG. 1. is a schematic representation of the longitudinal section of a high speed centrifugal gas-liquid separator, in which the vaporization is prevented by a cooling jacket on part of the tube periphery. The gas-liquid mixture enters at 11 through a channel of gradually decreasing cross section 12 tangentially at 13 into the cylindrical or cylindro-conical tube 14. The liquid is thrown to the periphery by the centrifugal force and discharged through slot 15 into the ring outlet space 16. The gas vortex continues through tube 18 into the spiral diffusor 19 and the gas discharge pipe 20. The tube section 14 from the inlet 13 to the liquid outlet 15 is surrounded by the cooling jacket 21. This cooling jacket cools the liquid so that vaporization is minimized. The cooling fluid enters at inlet pipe 22 and leaves at discharge pipe 23. The cooling jacket is insulated from the downstream hot tube section 18 by the insulation section 24. If the cooling or heating effect of the vortex expansion is used in a process, the central cold part of the gas may be taken out through the diaphragm 25 and cold pipe outlet 26. This cold outlet mat be insulated from the inlet similarly as the liquid outlet.

FIG. 2 is a schematic representation of the cross section A—A of the inlet of the tube. The gas or gas-liquid mixture enters at pipe 11 through the gradually decreasing cross section channel 12 into the tangential inlet opening 13 and tube 14. The smaller opening 25 is the optional cold outlet diaphragm.

FIG. 3 is a schematic representation of the longitudinal section of a high speed centrifugal gas-liquid separator, in which the vaporization is prevented by taking out the liquid at a distance of one diameter or less before the periphery of the tube section is heated. The gas or gas-liquid mixture enters through the pipe 31 along the curved channel 32 tangentially at 33 into the tube 34 where the vortex is formed. The liquid is thrown to the periphery and at a distance of one tube diameter or less it is taken out through slot 35 into the ring shaped space 36, from where it flows out through pipe 37. The liquid takeout section is insulated from the rest of the heated periphery by a ceramic or other type insulator 38. The gas vortex, stripped from its liquid content, continues in tube 39 where heat is transferred from its central part to the periphery, so that the core becomes cold and the periphery is heated to temperatures of in the range of hundreds of degrees higher than the inlet temperature. The kinetic energy of the vortex is changed into pressure in diffusor 40 and the gas leaves at discharge pipe 41. If the cold of the gas is utilized in the process, the cold gas is taken out through diaphragm 42 and pipe 43.

FIG. 4 is a schematic representation of the process flowsheet of a wellhead gas or oil-gas separator with high speed centrifugal gas-liquid separator. The gas or gas-liquid mixture from wellhead 51 flows into the knockout drum 52 where the solid particles are removed. Then it flows into the inlet of the vortex tube 54. The liquid is removed through pipe 55 and control valve 56 into the liquid drum 57. The gas from the vortex tube is taken out through pipe 58 and goes into the pipeline 59. If the cold gas stream from the process is utilized, it is taken out at 60. It may be used to cool the liquid in the liquid drum 57, trough pipe 61 and cooling coil 62, or it can be utilized elsewhere through pipe 63, or returned to the pipeline 59. The liquid is taken out from the liquid drum through pipe 64. The liquid flow from the votex tube can be controlle either through fow control sensors 65 in the ring shaped discharge of the vortex tube or through a liquid level sensor 66 in the liquid drum and control valve 67.

Having thus fully described my invention, what I claim as new and desire to secure by Letters Patent, is:

1. The centrifugal gas-liquid separator of the vortex tube type, in which the gas or gas-liquid mixture enters under pressure tangentially into a tube, where it expands forming a fast turning vortex, which:
   (a) separates the fluid into coaxially situated cold central and peripheral hot fractions by the heat separation effect, and creates an outermost peripheral liquid layer,
   (b) having a hot discharge zone at the end of the tube far from the inlet,
   (c) a cold gas discharge diaphragm opening at the side of the inlet opposite to the hot outlet,
   (d) with the improvement of preventing vaporization of the condensed liquid on the periphery by cooling a short tube section immediately after the inlet by a cooling jacket,
   (e) disposing a liquid withdrawal openings or slots after the cooling jacket, a short distance, one to three diameters from the inlet,
   (f) connecting the cooling jacket with a circulating coolant, and
   (g) a thermal insulation means disposed between the liquid outlet port and the hot tube section in order to prevent transfer of heat from the hot outlet to the liquid, thereby preventing vaporization.

2. The centrifugal gas-liquid separator of the vortex tube type described in claim 1, to separate the liquid components of a fluid, such as well-head gas condensate, with the following components:
   (a) a knockout drum to eliminate the solids from the fluids before entering the equipment,
   (b) a heat exchanger to utilize the cold of the cold of the cold outlet of the vortex tube in the separation process, to precool the inlet gas,
   (c) a vortex tube type centrifugal gas-liquid separator which separates the fluid into a cold gas stream, a hot gas stream and a condensate liquid stream,
   (d) the liquid drum in which, the liquid is cooled by a cooling coil, in order to prevent vaporization of the condensate during its passage into the products pipeline,
   (e) gas control valve on the hot gas outlet which controls the ratio of the cold gas stream to the hot gas, and the cold gas temperature,
   (f) control valve and control devices in the liquid outlet,
   (g) control valves in the cold gas section to control the vortex tube inlet temperature and the drum cooling coil temperature.

3. The centrifugal gas-liquid separator of the vortex tube type described in claim 1, in which the gas or gas-liquid mixture enters tangentially under pressure into a tube, where it expands, forming a fast turning vortex, which separates the fluid into coaxially situated central cold and peripheral hot fractions by the heat separation effect, and creates an outermost peripheral liquid condensate layer:
   (a) having a hot discharge zone at the end of the tube far from the inlet,
   (b) a cold discharge diaphragm opening at the side of the inlet opposite to the hot outlet, and
   (c) liquid outlet openings on the periphery of the tube at a short distance of about one diameter or less from the inlet for removing the liquid before vaporization thereof, and
   (d) a cooling jacket surrounding said tube immediately after the inlet and extending up to said openings for minimizing vaporization of the condensed liquid, and
   (e) insulation means insulating the liquid outlet port from the hot tube section in order to prevent transfer of heat from the hot outlet to the liquid.

4. The improved centrifugal gas-liquid separator of the vortex tube of claim 1, where said liquid outlet or outlets are connected to a doughnut or ring shaped liquid collecting room where a cylindrical liquid level is formed with a fast turning liquid vortex, the level of which varies according to the liquid flowrate; which liquid level is being utilized to control the flowrate, by using a high liquid level and a low liquid level outlet connected to a control means which varies the opening of the control valve in the liquid discharge line.

* * * * *